United States Patent
Liu

(10) Patent No.: US 8,165,725 B2
(45) Date of Patent: Apr. 24, 2012

(54) TEMPERATURE CONTROLLING DEVICE OF HEATING ELEMENT AND METHOD THEREOF

(75) Inventor: Xiaogang Liu, Shenzhen (CN)

(73) Assignee: L Lab Corporation, Shenzhen, Guangdong (CN)

( * ) Notice: Subject to any disclaimer, the term of this patent is extended or adjusted under 35 U.S.C. 154(b) by 811 days.

(21) Appl. No.: 11/887,081

(22) PCT Filed: Mar. 21, 2006

(86) PCT No.: PCT/CN2006/000454
§ 371 (c)(1),
(2), (4) Date: Dec. 3, 2008

(87) PCT Pub. No.: WO2006/099801
PCT Pub. Date: Sep. 28, 2006

(65) Prior Publication Data
US 2009/0182459 A1    Jul. 16, 2009

(30) Foreign Application Priority Data

Mar. 25, 2005 (CN) .......................... 2005 1 0033876

(51) Int. Cl.
| | |
|---|---|
| G05D 23/00 | (2006.01) |
| G01K 1/00 | (2006.01) |
| D06F 75/26 | (2006.01) |
| H05B 1/02 | (2006.01) |
| B23K 1/002 | (2006.01) |
| B23K 1/00 | (2006.01) |

(52) U.S. Cl. ........ 700/299; 702/130; 219/251; 219/494; 219/616; 228/51

(58) Field of Classification Search ............... 702/99, 702/130, 179, 189, 194; 219/229, 241, 251, 219/494, 616; 700/299; 228/51
See application file for complete search history.

(56) References Cited

U.S. PATENT DOCUMENTS

| | | | | |
|---|---|---|---|---|
| 4,891,497 | A | * | 1/1990 | Yoshimura ............... 219/241 |
| 5,431,339 | A | | 7/1995 | Yoda |
| 5,485,392 | A | * | 1/1996 | Frederickson et al. ....... 700/212 |
| 5,900,177 | A | * | 5/1999 | Lecouras et al. .............. 219/497 |

(Continued)

FOREIGN PATENT DOCUMENTS

| | | |
|---|---|---|
| CN | 2575734 | 9/2003 |
| JP | 06-012133 | 1/1994 |
| JP | 2001-296901 | 10/2001 |

OTHER PUBLICATIONS

International Search Report of PCT/CN2006/000454 dated Jul. 13, 2006.

*Primary Examiner* — Albert Decady
*Assistant Examiner* — Darrin Dunn
(74) *Attorney, Agent, or Firm* — Hamre, Schumann, Mueller & Larson, P.C.

(57) ABSTRACT

A kind of temperature controlling device of heating element and method thereof detect the actual temperature of heating body of the heating element, and calculate the descending gradient and frequency of temperature based on the detected actual temperature. The norm signal is formed based on the actual temperature, descending gradient and frequency of the temperature to control the switch power as to achieve the split second control for the electric power of the heating element.

6 Claims, 1 Drawing Sheet

U.S. PATENT DOCUMENTS

| | | | |
|---|---|---|---|
| 6,470,238 B1 * | 10/2002 | Nizar et al. | 700/299 |
| 6,560,514 B1 * | 5/2003 | Schultz et al. | 700/299 |
| 6,563,087 B1 * | 5/2003 | Yokoyama et al. | 219/240 |
| 2004/0054486 A1 * | 3/2004 | Schilling et al. | 702/99 |
| 2008/0040066 A1 * | 2/2008 | Busch et al. | 702/130 |
| 2008/0177412 A1 * | 7/2008 | Yamaguchi et al. | 700/114 |

\* cited by examiner

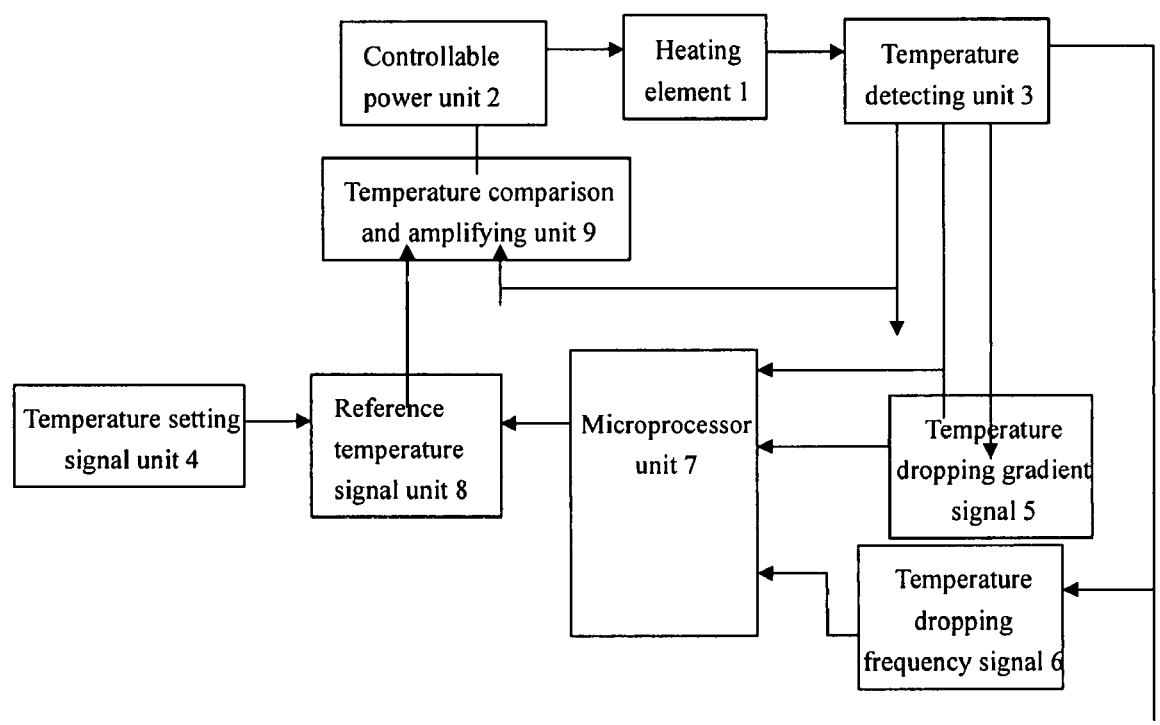

TEMPERATURE CONTROLLING DEVICE OF HEATING ELEMENT AND METHOD THEREOF

FIELD OF THE INVENTION

The present invention relates to temperature control technologies for the heating elements, more particularly, to a method and apparatus for power control of the heating element in the electric heating device such as electric soldering iron based on temperature.

BACKGROUND OF THE INVENTION

Electric heating elements are used more and more widely, and the conventional methods for temperature-power control of the electric heating elements usually utilize absolute temperature control manner, that is, these methods only sample and control the absolute temperature of the heating element, but cannot determine the work status of the heating element and the thermal requirement of the heated object and its effect to the temperature. When the temperature is falling, the transient response of the heating element is poor, thus the re-rising of the temperature is slow, and this cannot be used in the case that the heat transfer of the heating element changes rapidly. For example, temperature of the electric soldering iron is very high when it does not touch the metal to be welded, once it touches a big-size metal object or keeps contacting with the metal object for a long period of time, temperature of the electric soldering iron may fall rapidly due to the fast heat transfer, especially in the case that the metal to be welded has a large surface or the environmental temperature is low. The conventional temperature control technologies for the electric soldering iron only consider the absolute temperature of the welding head, therefore the adjusting speed is slow, the power adjust cannot catch up with the variation of temperature, and the change of the power adjustment cannot catch up with the change of the temperature, even in some particular situations, the welding requirements cannot be satisfied because of the control delay.

SUMMARY OF THE INVENTION

One aspect of the present invention is to provide a method and apparatus for power control of the heating element in the electric heating devices, which can rapidly detect change of temperature of the electric soldering iron or such other electric heating devices and rapidly adjust the power of the electric heating elements based on the change of temperature, to insure that the electric heating elements may work at a substantially constant temperature.

According to an aspect of the present invention, a method for controlling temperature of heating element is provided, comprising:

a) detecting the temperature of a heater of the heating element;

b) generating a reference signal;

c) comparing the detected actual temperature with the reference signal;

d) generating a electric power to be applied to the heating element by a controllable power amplifying unit based on the comparison result;

wherein said step b) of generating the reference signal further comprises:

b1) calculating a temperature dropping gradient signal based on the detected actual temperature;

b2) calculating a temperature dropping frequency signal based on the detected actual temperature;

b3) generating the reference signal based on a selected temperature, the temperature dropping gradient signal and the temperature dropping frequency signal.

Advantageously, said reference signal is proportional to the temperature dropping gradient signal.

Advantageously, said reference signal is proportional to the temperature dropping frequency signal.

Advantageously, said step b3) further comprises:

b31) generating an additional temperature signal based on the temperature dropping gradient signal and the temperature dropping frequency signal;

b32) combining the additional temperature signal and the selected temperature to said reference signal;

wherein said step b31) of generating the additional temperature signal based on the temperature dropping gradient signal and the temperature dropping frequency signal is achieved through looking up a table with preset experiential data of the additional temperature signal by a CPU.

Advantageously, said step b3) further comprises:

b33) generating an additional temperature signal based on the actual temperature signal, the temperature dropping gradient signal and the temperature dropping frequency signal;

b34) combining the additional temperature signal and the selected temperature to said reference signal;

wherein said step b33) of generating the additional temperature signal based on the actual temperature signal, the temperature dropping gradient signal and the temperature dropping frequency signal is achieved through looking up a table with preset experiential data of the additional temperature signal by a CPU.

According to another aspect of the present invention, an apparatus for controlling temperature of heating element is provided, comprising a heating element 1, a controllable power unit 2 for driving the heating element 1, and a temperature detecting unit 3 for detecting the actual temperature of the heater of the heating element 1, and further comprising a control unit for controlling said controllable power unit 2 based on a actual temperature signal output by the temperature detecting unit 3 and a given temperature signal 4, characterized in that said control unit comprises:

a temperature dropping gradient signal generating unit 5 for generating a temperature dropping gradient signal based on the actual temperature signal output by the temperature detecting unit 3;

a temperature dropping frequency signal generating unit 6 for generating a temperature dropping frequency signal based on the actual temperature signal output by the temperature detecting unit 3;

a microprocessor unit 7 for determining an additional temperature signal through looking up a table based on the actual temperature signal, the temperature dropping gradient signal and the temperature dropping frequency signal;

a reference temperature signal unit 8 for combining the additional temperature signal and the given temperature signal; and a temperature comparison and amplifying unit 9 for generating a control signal for said controllable power unit 2 by comparing the reference temperature signal output by the reference temperature signal unit 8 with the actual temperature signal output by the temperature detecting unit 3, wherein the controllable power unit 2 is a switching power circuit.

The method and apparatus for controlling temperature of heating element in accordance with the present invention may be applied to the electric soldering iron or such other electric heating devices, to efficiently and rapidly control the electric power of the heating element based on the temperature change of the heater of the heating element, insuring that in operation, the temperature of the heating element such as iron core of the electric soldering iron keeps at a setting temperature, which is adjustable according to the requirement, no matter how temperature of the heat load and temperature of the environment change. Therefore the method and apparatus in accordance with the present invention can save electric power, prolong life time of the electric heating element, and can also be applied to other cases where high electric heating temperature is demanded and electric heat load has variation.

BRIEF DESCRIPTION OF THE DRAWINGS

FIG. 1 is a schematic diagram of the apparatus for controlling temperature of heating element according to the present invention.

DETAILED DESCRIPTION OF THE PREFERRED EMBODIMENT

The method and apparatus for controlling temperature of heating element provided by the present invention, adopt a tridimensional control method, i.e. sampling and determining the absolute temperature, the temperature dropping gradient and the temperature dropping frequency, and then make a optimum control by a CPU. If a temperature curve that is sampled in a certain period of time changes gently, it is indicated that the heated object requires even heat quantity, then an absolute temperature control method may be utilized. If the sampled temperature curve has large dropping gradient, it is indicated that the heat quantity requirement of the heated object is increased instantaneously, and a significant dropping of temperature occurs, then an additional temperature value can be added to the preset temperature as a compensation, to compensate the temperature dropping of the heating element due to a lack of heat, and to increase the temperature rapidly. If too many temperature dropping points exist in the sampled temperature curve, it is indicated that the heated object requires frequently heating, and the average heat demand is high, so an additional temperature can also added to the preset temperature to compensate the lack of heat. Accordingly, a transient dynamic response of the heating element can be significantly improved.

A first embodiment of the controlling method in accordance with the present invention is as below:

1. Setting an ideal temperature of the heated object (referred as given temperature) $T_0$;
2. Detecting a actual temperature $T(t)$ of a heater of the heating element;
3. Calculating a temperature dropping gradient $dT/dt$;
4. Calculating a temperature dropping frequency $d^2T/dt^2$;
5. Calculating a first temperature adjusting value DT1 based on a difference between the actual temperature and the set temperature, i.e. $DT1=T(t)-T_0$;
6. Calculating a second temperature adjusting value DT2 based on the temperature dropping gradient of the heating element, i.e. $DT2=f(dT/dt)$;
7. Calculating a third temperature adjusting value DT3 based on the temperature dropping frequency of the heating element, i.e. $DT3=f(d^2T/dt^2)$;
8. Calculating a total temperature adjusting value $DT=DT1+DT2+DT3$;
9. Determining input power of the heating element, i.e. operating voltage supplied to the heating element by the switching power supply, based on the total temperature adjusting value.

Wherein in the step 6, determination of the second temperature adjusting value based on the temperature dropping gradient of the heating element can be achieved through looking up a table.

In the step 7, determination of the third temperature adjusting value based on the temperature dropping frequency of the heating element can also be achieved through looking up a preset relation function table. The above steps 5-7 can also be combined to form a second embodiment as below:

1. Setting a ideal temperature of the heated object (referred as given temperature) $T_0$;
2. Detecting a actual temperature $T(t)$ of the heater of the heating element;
3. Calculating a temperature dropping gradient $dT/dt$;
4. Calculating a temperature dropping frequency $d^2T/dt^2$;
5. Calculating a total temperature adjusting value DT through looking up a table based on the actual temperature $T(t)$, the temperature dropping gradient $dT/dt$ and the temperature dropping frequency $d^2T/dt^2$, i.e. $DT=f(T(t), dT/dt, d^2T/dt^2)$;
6. Determining input power of the heating element, i.e. operating voltage supplied to the heating element by the switching power supply, based on the total temperature adjusting value.

Wherein, the calculation of the temperature dropping gradient $dT/dt$ can be achieved by a differential circuit, and the calculation of the temperature dropping frequency $d^2T/dt^2$ can be achieved by a counting circuit for differential signals. The calculation of the total temperature adjusting value $DT=f(T(t), dT/dt, d^2T/dt^2)$ through looking up a table, based on the actual temperature $T(t)$, the temperature dropping gradient $dT/dt$ and the temperature dropping frequency $d^2T/dt^2$, can be achieved through looking up a tridimensional table, wherein data DT in the tridimensional table may be obtained through experiments and be preset in the microprocessor.

Referring to FIG. 1, in the embodiment of the apparatus for controlling temperature of heating element in accordance with the present invention, a controllable power unit or controllable voltage adjustor 2 supply output voltage U to the heating element 1, and then the heating element 1 transfers generated heat to the heated object (not shown in the FIGURE). Actual temperature of the heater of the heating element 1 is detected by a temperature sensor (i.e. a temperature detecting unit 3) which tightly touches the heated object. Then in one hand, the actual temperature is directly send to a microprocessor unit 7 through a temperature-voltage transforming amplifier; and in the other hand, the actual temperature is converted into a temperature dropping gradient signal by a temperature dropping gradient signal generating unit 5 consisted of differential circuits and then the temperature dropping gradient signal is sent to a input port of the microprocessor 7; in the third hand, a temperature dropping frequency signal generating unit 6 statistically counts dropping variation of the actual temperature signal to obtain a temperature dropping frequency signal, which is then sent to the microprocessor 7. In the microprocessor unit 7, an additional temperature signal is determined based on the actual temperature signal, the temperature dropping gradient signal and the temperature dropping frequency signal, and then it is sent together with a given temperature signal from a given temperature signal unit 4 to a reference temperature signal generating unit 8 (which may be an adder), where these two signals are combined to form a reference signal. The reference signal is compared with the actual temperature in a temperature comparison and amplifying unit 9 to generate a control signal for the controllable power unit 2 controlling electric power of the heating element 1. Since the additional temperature signal provided by the microprocessor is generated in consideration of the temperature dropping gradient and the temperature dropping frequency, the temperature control of the present invention significantly improves transient response, compared with the single control mode only considering the actual temperature. The controllable power unit 2 may be a switching power circuit.

The invention claimed is:

1. A method for controlling temperature of a heating element, comprising:
   a) detecting a temperature of a heater of the heating element and generating a detected actual temperature signal;
   b) generating a reference signal;
   c) comparing the detected actual temperature signal with the reference signal and generating a comparison result;
   d) generating an electric power by a controllable power amplifying unit based on the comparison result; and
   e) applying the electric power to the heating element;
   wherein said step b) includes:
   b1) calculating a temperature dropping gradient signal based on the detected actual temperature signal;
   b2) calculating a temperature dropping frequency signal based on the detected actual temperature signal;
   b3) generating the reference signal based on a combination of a given temperature signal, the temperature dropping gradient signal and the temperature dropping frequency signal.

2. The method as in claim 1, wherein said step b3) includes:
   b31) generating an additional temperature signal based on the temperature dropping gradient signal and the temperature dropping frequency signal;
   b32) combining the additional temperature signal and the given temperature signal to generate said reference signal;
   wherein said step b31) is achieved through looking up a table with preset experiential data of the additional temperature signal by a CPU.

3. The method as in claim 1, wherein said step b3) includes:
   b33) generating an additional temperature signal based on the actual temperature signal, the temperature dropping gradient signal and the temperature dropping frequency signal;
   b34) combining the additional temperature signal and the given temperature signal to generate said reference signal;
   wherein said step b33) is achieved through looking up a table with preset experiential data of the additional temperature signal by a CPU.

4. An apparatus for controlling temperature of a heating element, comprising:
   the heating element;
   a controllable power unit for driving the heating element;
   a given temperature signal unit for providing a given temperature signal;
   a temperature detecting unit for detecting an actual temperature of a heater of the heating element;
   a control unit for controlling said controllable power unit based on an actual temperature signal outputted output by the temperature detecting unit and the given temperature signal unit, said control unit including:
      a temperature dropping gradient signal generating unit for generating a temperature dropping gradient signal based on the actual temperature signal outputted the temperature detecting unit;
      a temperature dropping frequency signal generating unit for generating a temperature dropping frequency signal based on the actual temperature signal outputted the temperature detecting unit;
      a microprocessor unit for determining an additional temperature signal through looking up a table based on a combination of the actual temperature signal, the temperature dropping gradient signal and the temperature dropping frequency signal;
      a reference temperature signal unit for combining the additional temperature signal and the given temperature signal to generate a reference signal; and
      a temperature comparison and amplifying unit for generating a control signal for said controllable power unit by comparing the reference signal outputted by the reference temperature signal unit with the actual temperature signal outputted by the temperature detecting unit.

5. The apparatus as in claim 4, wherein the controllable power unit is a switching power circuit.

6. The apparatus as in claim 4, wherein the controllable power unit receives the control signal and generates an electric power for the heating element.

* * * * *